(12) United States Patent
Yokoyama et al.

(10) Patent No.: US 9,093,704 B2
(45) Date of Patent: Jul. 28, 2015

(54) NON-AQUEOUS ELECTROLYTE SECONDARY BATTERY

(75) Inventors: Tomohiko Yokoyama, Osaka (JP); Hideharu Takezawa, Nara (JP); Masato Fujikawa, Osaka (JP); Shinji Kasamatsu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1203 days.

(21) Appl. No.: 12/596,762

(22) PCT Filed: Nov. 19, 2008

(86) PCT No.: PCT/JP2008/003392
§ 371 (c)(1),
(2), (4) Date: Oct. 20, 2009

(87) PCT Pub. No.: WO2009/069266
PCT Pub. Date: Jun. 4, 2009

(65) Prior Publication Data
US 2010/0136428 A1    Jun. 3, 2010

(30) Foreign Application Priority Data

Nov. 26, 2007    (JP) .................................. 2007-304694
Nov. 18, 2008    (JP) .................................. 2008-294452

(51) Int. Cl.
*H01M 2/34* (2006.01)
*H01M 10/00* (2006.01)
*H01M 10/02* (2006.01)
*H01M 4/38* (2006.01)
*H01M 4/13* (2010.01)
*H01M 4/139* (2010.01)

(Continued)

(52) U.S. Cl.
CPC ...... *H01M 4/38* (2013.01); *H01M 4/13* (2013.01); *H01M 4/139* (2013.01); *H01M 10/0431* (2013.01); *H01M 10/0525* (2013.01); *H01M 10/4235* (2013.01); *Y02E 60/122* (2013.01)

(58) Field of Classification Search
None
See application file for complete search history.

(56) References Cited

U.S. PATENT DOCUMENTS

2002/0015892 A1    2/2002  Kitoh
2004/0126650 A1*   7/2004  Kim .............................. 429/61

(Continued)

FOREIGN PATENT DOCUMENTS

EP    1 953 850 A1    8/2008
JP    09-161805       6/1997

(Continued)

OTHER PUBLICATIONS

Japanese Office Action issued in Japanese Patent Application No. 2008-294452 dated Jul. 12, 2012.

*Primary Examiner* — Yoshitoshi Takeuchi
(74) *Attorney, Agent, or Firm* — McDermott Will & Emery LLP (57) ABSTRACT

The non-aqueous electrolyte secondary battery of the present invention is provided with an electrode plate group and a non-aqueous electrolyte, the electrode plate group including a positive electrode, a negative electrode, a separator interposed between the positive electrode and the negative electrode, a positive electrode lead connected to the positive electrode, and a negative electrode lead connected to the negative electrode. The energy density of the electrode plate group is 750 Wh/L or higher by volume, and the cross-sectional area of at least one of the positive electrode lead and the negative electrode lead is $5.5 \times 10^{-5}$ to $1.2 \times 10^{-2}$ cm$^2$.

7 Claims, 4 Drawing Sheets (51) Int. Cl.
*H01M 10/04* (2006.01)
*H01M 10/0525* (2010.01)
*H01M 10/42* (2006.01)

(56) References Cited

U.S. PATENT DOCUMENTS

2006/0286438 A1* 12/2006 Fujikawa et al. ............... 429/61
2006/0286439 A1   12/2006 Fujikawa et al.

FOREIGN PATENT DOCUMENTS

| | | | | |
|---|---|---|---|---|
| JP | H10-214614 A | | 8/1998 | |
| JP | 11-345630 | | 12/1999 | |
| JP | 2006-260786 | | 9/2006 | |
| JP | 2007-066616 | | 3/2007 | |
| JP | WO 2007-052803 | * | 5/2007 | .............. H01M 4/02 |
| JP | EP 1953850 | * | 8/2008 | .............. H01M 4/02 |
| WO | WO 2006/134684 A1 | | 12/2006 | |
| WO | WO 2007/052803 A1 | | 5/2007 | |

* cited by examiner

NON-AQUEOUS ELECTROLYTE SECONDARY BATTERY

RELATED APPLICATIONS

This application is the U.S. National Phase under 35 U.S.C. §371 of International Application No. PCT/JP2008/003392, filed on Nov. 19, 2008, which in turn claims the benefit of Japanese Application Nos. 2007-304694, filed on Nov. 26, 2007 and 2008-294452, filed on Nov. 18, 2008, the disclosures of which Applications are incorporated by reference herein.

TECHNICAL FIELD

The present invention relates to a non-aqueous electrolyte secondary battery, and particularly relates to a non-aqueous electrolyte secondary battery having high capacity and improved safety.

BACKGROUND ART

Many types of non-aqueous electrolyte batteries are known, and lithium ion secondary batteries can be given as a typical non-aqueous electrolyte battery. Lithium ion secondary batteries can be used at normal temperature, are high in both capacity and energy density, and have excellent cycle characteristics. For this reason, lithium ion secondary batteries are widely used as the power source for portable small-size electronic devices such as cellular phones, personal digital assistants (PDA), laptop computers, and video cameras. With achievements of high-level functionality and the like in compact electronic devices as mentioned above, the achievement of higher capacity in lithium ion secondary batteries is being anticipated.

In response to this demand, high-capacity positive electrode active materials and high-capacity negative electrode active materials are undergoing development anew. In particular, expectations are high for a lithium ion secondary battery using an alloy-type negative electrode active material which can be alloyed with lithium. Known examples of an alloy-type negative electrode active material are: a simple substance of silicon (Si) or tin (Sn); an oxide of either thereof; and an alloy containing Si or Sn. An alloy-type negative electrode active material has a high discharge capacity and is thus effective in achieving higher capacity in a lithium ion secondary battery. For example, the theoretical discharge capacity of silicon is about 4199 mAh/g, which is about 11 times higher than the theoretical discharge capacity of graphite.

In this manner, since a lithium ion secondary battery including an alloy-type negative electrode active material has a high energy density, its current value becomes higher compared to a conventional lithium ion secondary battery. Thus, the battery temperature tends to rise easily. Therefore, being anticipated are highly-safe lithium ion secondary batteries in which: in the case where an external short circuit occurs, discharge is not conducted until the possibility arises of the battery temperature rising rapidly; and discharge can be reliably stopped.

On the other hand, Patent Document 1 proposes adjusting the total cross-sectional area of the plurality of leads connected to the positive electrode current collector and the negative electrode current collector in a lithium ion secondary battery, the adjustment made in accordance with the material of the leads. In Patent Document 1, amorphous carbon materials such as soft carbon and hard carbon, or carbon powders such as of artificial graphite and of natural graphite are used as the negative electrode active material, while alloy-type negative electrode active materials having a higher capacity are not. In addition, the total cross-sectional area of the leads is adjusted in Patent Document 1 in order to prevent the leads from melting, even in the case where a large current of at least 100 A flows. By the above, an attempt is made to achieve the goal of making the battery operate reliably at all times. This is due to the fact that the lithium ion secondary battery of Patent Document 1 is for use as the power source for motor drives in hybrid electric cars and the like.

Patent Document 1: Japanese Laid-Open Patent Publication No. Hei 11-345630

DISCLOSURE OF THE INVENTION

Problem to be Solved by the Invention

The capacity of an alloy-type negative electrode active material is higher than that of a carbon material-type negative electrode active material; however, the conductivity of an alloy-type negative electrode active material is lower than that of a carbon material-type negative electrode active material. Therefore, it is assumed that there is a difference in resistance between a negative electrode including an alloy-type negative electrode active material and a negative electrode including a carbon material-type negative electrode active material. That is, it is considered that there is a large difference in behavior during discharge, between a negative electrode including an alloy-type negative electrode active material and a negative electrode including a carbon material-type negative electrode active material. Due to the above, the art of Patent Document 1 cannot be directly applied to a lithium ion secondary battery provided with a negative electrode including an alloy-type negative electrode active material.

Compared to a lithium ion secondary battery including a carbon material as a negative electrode active material, a lithium ion secondary battery including an alloy-type negative electrode active material has a higher energy density, in the case where both batteries are of the same size. Further, as a result of studies made by the present inventors, it was found that the negative electrode including an alloy-type negative electrode active material, despite the conductivity of the negative electrode active material not being particularly high, was, for example, low in resistance during high-output discharge (that is, having excellent output characteristics). However, in a lithium ion secondary battery including an alloy-type negative electrode active material, in the case where an external short circuit occurs for example, the value of the current that flows through the battery is significantly larger compared to the value of the current that flows through a lithium ion secondary battery using a carbon material as a negative electrode active material. Therefore, there is a possibility of the battery temperature rising rapidly in the case where an external short circuit occurs in a lithium ion secondary battery including an alloy-type negative electrode active material.

Accordingly, an object of the present invention is to provide a high-capacity non-aqueous electrolyte secondary battery having further improved safety.

Means for Solving the Problem

A non-aqueous electrolyte secondary battery of the present invention is provided with an electrode plate group and a non-aqueous electrolyte. The electrode plate group is provided with: a positive electrode; a negative electrode; a separator interposed between the positive electrode and the negative electrode; a positive electrode lead connected to the positive electrode; and a negative electrode lead connected to the negative electrode. The electrode plate group has an energy density of 750 Wh/L or higher by volume, and at least one of the positive electrode lead and the negative electrode lead has a cross-sectional area of $5.5 \times 10^{-5}$ to $1.2 \times 10^{-2}$ cm$^2$.

Here, by a cross-sectional area of a lead is meant a cross-sectional area of a face thereof that is vertical in the longitudinal axis direction and parallel to the thickness direction thereof.

The negative electrode includes: a negative electrode current collector; and a negative electrode active material layer formed on the negative electrode current collector. The ratio of the cross-sectional area of the negative electrode lead relative to the volume of the negative electrode current collector is preferably $1.0 \times 10^{-4}$ to $7.0 \times 10^{-3}$ (cm$^2$/cm$^3$).

The negative electrode active material layer includes a plurality of columnar particles including the negative electrode active material, and preferably, columnar particles are grown from a surface of the negative electrode current collector in a direction roughly vertical to the surface thereof or in a direction tilted from such vertical direction.

Since the surface of the current collector is flat seen visually, the normal direction of the surface of the current collector (the direction vertical to the surface) is unambiguously defined.

The columnar particle preferably includes a stacking body of a plurality of particle layers. Each particle layer may grow in a different direction. Alternatively, the growing directions of the plurality of particle layers included in the stacking body may be tilted from the normal direction of the surface of the current collector, alternately in a first direction and a second direction.

The negative electrode active material layer preferably includes a material containing at least one element selected from the group consisting of silicon and tin. In a preferred embodiment of the present invention, the material included in the negative electrode active material layer contains at least one member selected from the group consisting of a simple silicon substance, a silicon alloy, a compound containing silicon and oxygen, and a compound containing silicon and nitrogen. In another preferred embodiment of the present invention, the material contains at least one member selected from the group consisting of a simple tin substance, a tin alloy, and a compound containing tin and oxygen.

Effect of the Invention

In the non-aqueous electrolyte secondary battery of the present invention, the electrode plate group has an energy density of 750 Wh/L or higher by volume, and at least one of the positive electrode lead and the negative electrode lead has a cross-sectional area of $5.5 \times 10^{-5}$ to $1.2 \times 10^{-2}$ cm$^2$. Due to the above, the non-aqueous electrolyte secondary battery of the present invention is able to stably obtain high output characteristics, and even in the case where an external short circuit or the like occur for example, the negative electrode lead can be melted before a large current flows for a prolonged period of time. Thus, due to the present invention, a high-capacity non-aqueous electrolyte secondary battery having further improved safety can be provided.

BEST MODE FOR CARRYING OUT THE INVENTION

Figure 1:
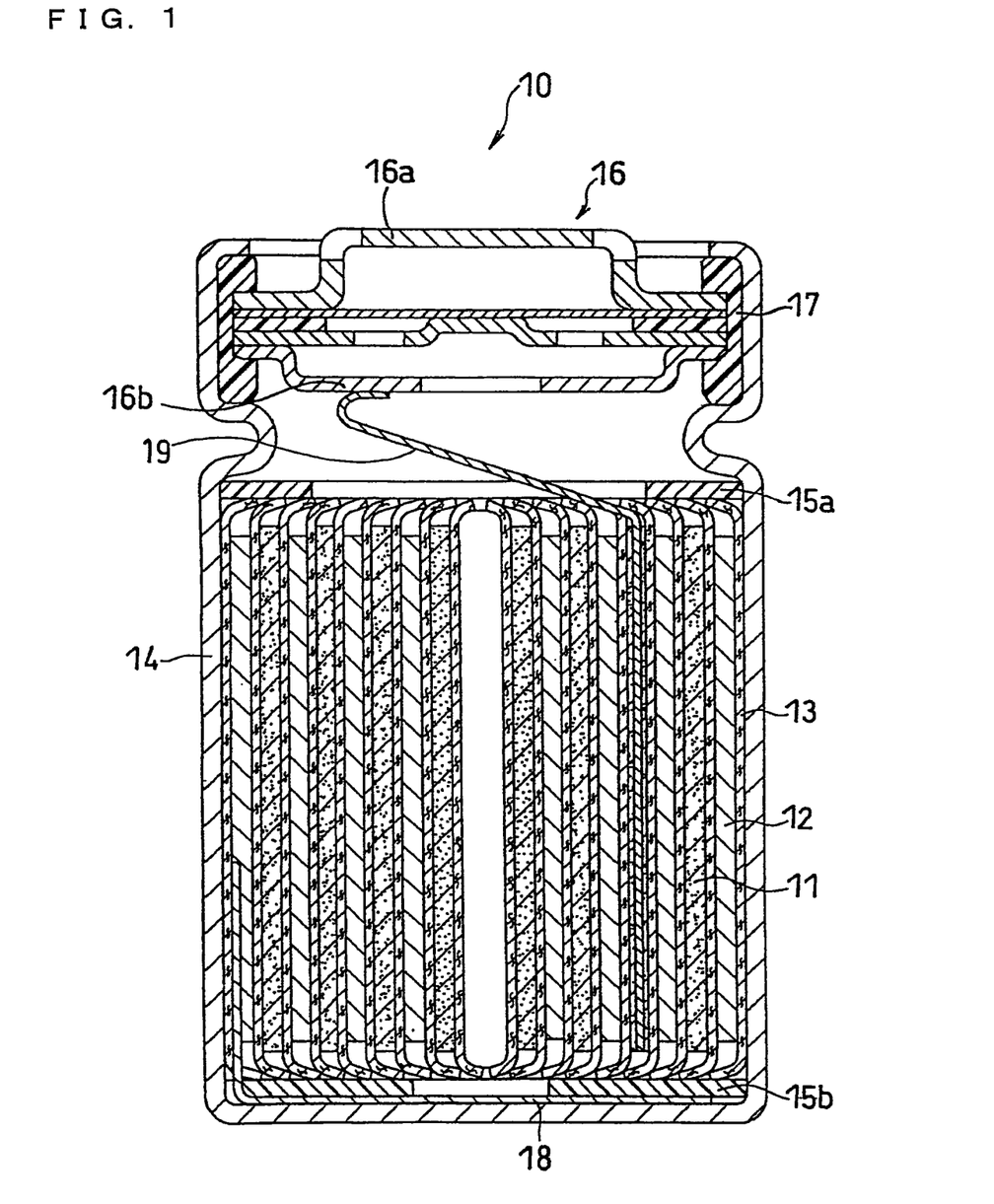
FIG. 1 is a vertical sectional view schematically illustrating a non-aqueous electrolyte secondary battery in accordance with an embodiment of the present invention.

FIG. 1 illustrates a non-aqueous electrolyte secondary battery in accordance with an embodiment of the present invention. The non-aqueous electrolyte secondary battery in FIG. 1 is provided with: a power generating element including an electrode plate group and a non-aqueous electrolyte (not illustrated); and a battery case 14 containing the power generating element. The electrode plate group includes a positive electrode 11, a negative electrode 12, and a separator 13 disposed between the positive electrode 11 and the negative electrode 12, and is formed by winding a stacking body of the positive electrode 11, the separator 13, and the negative electrode 12. The electrode plate group is sandwiched between a top insulating plate 15a and a bottom insulating plate 15b. The battery case 14 is sealed by crimping the opened end of the battery case 14 onto a sealing plate 16 with a gasket 17 interposed therebetween.

One end of a negative electrode lead 18 is connected to the negative electrode 12, and the other end of the negative electrode lead 18 is connected to the inner bottom face of the battery case 14. One end of a positive electrode lead 19 is connected to the positive electrode 11, and the other end of the positive electrode lead 19 is connected to a metallic portion 16b which is the bottom face of the sealing plate 16. This metallic portion 16b is electrically connected to a positive electrode terminal 16a provided in the sealing plate 16.

In the present invention, the electrode plate group has an energy density of 750 Wh/L or higher by volume, and at least one of the negative electrode lead 18 and the positive electrode lead 19 has a cross-sectional area of $5.5 \times 10^{-5}$ to $1.2 \times 10^{-2}$ cm$^2$.

As the above, a lithium ion secondary battery including an alloy-type negative electrode active material has a higher energy density compared to a lithium ion secondary battery including a carbon material as a negative electrode active material, in the case where both batteries are of the same size. For example, the energy density of the electrode plate group by volume can be made as high as 750 Wh/L or higher in a lithium ion secondary battery including an alloy-type negative electrode active material. Further, in a negative electrode including an alloy-type negative electrode active material, despite the conductivity of the negative electrode active material not being so high, for example, the resistance during high-output discharge is low. However, in a lithium ion secondary battery including such an alloy-type negative electrode active material, in the case where an external short circuit occurs for example, the value of the electrical current that flows through the battery is significantly larger compared to the value of the electrical current that flows through a lithium secondary battery including a carbon material as a negative electrode active material, and thus, there is a possibility of the battery temperature rising rapidly.

In the present invention, particularly in the case of using an electrode plate group whose energy density is 750 Wh/L or higher by volume, the negative electrode lead can be melted, for example, in about 20 seconds, before a large current flows for a prolonged period of time, by making the cross-sectional area of the lead be $1.2 \times 10^{-2}$ cm$^2$ or smaller. If the cross-sectional area of the lead becomes smaller than $5.5 \times 10^{-5}$ cm$^2$, it would result in the lead melting during high-output discharge performed within the range of common use. If the cross-sectional area of the lead becomes larger than $1.2 \times 10^{-2}$ cm$^2$, in the case where an external short circuit occurs, a large current would flow inside the battery without the lead being disconnected, and thus, a rapid rise in the battery temperature would occur.

As the material composing the negative electrode lead 18, for example, nickel, copper, and a clad material of nickel and copper can be given.

As the material composing the positive electrode lead 19, for example, metallic aluminum, an aluminum alloy, and the like can be given. In the case of using the negative electrode lead 18 and the positive electrode lead 19 composed of any one of the materials mentioned above, the effects of the present invention can be obtained by adjusting the cross-sectional areas of the negative electrode lead 18 and the positive electrode lead 19 to be within the ranges mentioned above.

It is preferable that at least the cross-sectional area of the negative electrode lead is within the range of $5.5 \times 10^{-5}$ to $1.2 \times 10^{-2}$ cm$^2$, since the effects of the present invention can be obtained distinctively due to the above.

The positive electrode 11 can include, for example, a positive electrode current collector and a positive electrode active material layer carried thereon. Similarly, the negative electrode 12 can include a negative electrode current collector and a negative electrode active material layer carried thereon.

It is preferable that the ratio of the cross-sectional area of the negative electrode lead relative to the volume of the negative electrode current collector is $1.0 \times 10^{-4}$ to $7.0 \times 10^{-3}$ (cm$^2$/cm$^3$). If the ratio is smaller than $1.0 \times 10^{-4}$ (cm$^2$/cm$^3$), there is a possibility of the negative electrode lead melting in the case where high-output discharge is performed within the range of common use. If the ratio is larger than $7.0 \times 10^{-3}$ (cm$^2$/cm$^3$), there is a possibility of the negative electrode lead not melting even in the case of a large current flowing through the battery due to an external short circuit and the like, thus resulting in a rise in the battery temperature.

In the case of a wound-type electrode plate group such as that illustrated in FIG. 1, the negative electrode lead 18 may be connected to the exposed portion of the negative electrode current collector provided at the end of the winding-start side of the negative electrode 12, or may be connected to the exposed portion of the negative electrode current collector provided at the end of the winding-end side thereof. Alternatively, the exposed portion of the negative electrode current collector may be provided at a substantially center portion (the center portion or near the center portion of the negative electrode) of the negative electrode 12 entirely in the width direction thereof, and the negative electrode lead 18 may be connected to that exposed portion.

In the case where the negative electrode lead 18 is connected to the exposed portion of the negative electrode current collector provided at the end of the winding-start side of the negative electrode 12, or to the exposed portion of the negative electrode current collector provided at the end of the winding-end side of the negative electrode, the assembling of the battery becomes easier. In the case where the negative electrode lead 18 is connected to the substantially center portion of the negative electrode 12, since the current collecting efficiency improves, a battery with further excellence in safety and high output characteristics can be obtained. The above applies to the positive electrode lead 19 as well. In addition, it is preferable that the end of the negative electrode lead 18 not connected to the negative electrode 12, and the end of the positive electrode lead 19 not connected to the positive electrode 11, are disposed in directions opposite from one another.

The capacity of the non-aqueous electrolyte secondary battery of the present invention is preferably 1,000 mAh or higher.

The lead can be connected to the electrode by using a method well known in the art. As examples of such method, ultrasonic welding, resistance welding, clinch-jointing, and the like can be given.

Since obtained a electrode plate group having a high energy density, the negative electrode active material preferably includes a material containing at least one element selected from the group consisting of silicon (Si) and tin (Sn). The negative electrode active material particularly preferably includes a material containing silicon. As a material containing silicon, for example, a simple silicon substance, a silicon alloy, a compound containing silicon and oxygen, and a compound containing silicon and nitrogen can be given. The compound containing silicon and oxygen may further contain nitrogen.

The silicon alloy contains silicon and a metallic element "M" other than silicon. The metallic element "M" is preferably a metallic element that does not form an alloy with lithium. The metallic element "M" is acceptable as such as long as it is a chemically stable electronic conductor, and is preferably at least one selected from the group consisting of, for example, titanium (Ti), copper (Cu), and nickel (Ni). For the metallic element "M", one of the above may be contained in the silicon alloy alone, or several of the above may be contained in the silicon alloy.

The range for the molar ratio between silicon and the metallic element "M" in the silicon alloy is preferable as follows.

In the case where the metallic element "M" is Ti, 0<Ti/Si<2 is preferable, and 0.1≤Ti/Si≤1.0 is particularly preferable.

In the case where the metallic element "M" is Cu, 0<Cu/Si<4 is preferable, and 0.1≤Cu/Si≤2.0 is particularly preferable.

In the case where the metallic element "M" is Ni, 0<Ni/Si<2 is preferable, and 0.1≤Ni/Si≤1.0 is particularly preferable.

The compound containing silicon and oxygen preferably has a composition represented by a formula (1) as follows:

SiO$_x$ (It should be noted that 0<x<2)     (1)

Here, a value "x" indicating the content of the oxygen element is more preferably 0.01≤x≤1.

The compound containing silicon and nitrogen preferably has a composition represented by a formula (2) as follows:

SiN$_y$ (It should be noted that 0<y<4/3)     (2)

Here, a value "y" indicating the content of the nitrogen element is more preferably 0.01≤y≤1.

As the material containing tin, for example, a simple tin substance, a tin alloy, and a material containing tin and oxygen can be given.

As the tin alloy, for example, an Ni—Sn alloy, an Mg—Sn alloy, an Fe—Sn alloy, a Cu—Sn alloy, and a Ti—Sn alloy can be given.

As the material containing tin and oxygen, for example, a formula (3) can be given as follows:

SnO$_z$ (where 0<z≤2)     (3)

In $SnO_z$ of the formula (3), a value "z" indicating the content of the oxygen element (a molar ratio "z" of O relative to Sn) is preferably 0.01 to 1.

The form of the negative electrode active material layer included in the negative electrode is not particularly limited. For example, the negative electrode active material layer may be in a form of a thin film. The negative electrode active material layer in thin film form may be composed of a plurality of columnar particles. The active material layer including columnar particles can be formed, for example, by providing projecting areas on a surface of a current collector, and then making an active material vapor-deposited on such current collector.

Figure 2:
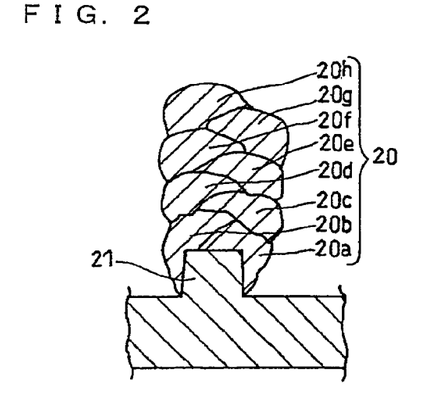
FIG. 2 is a vertical sectional view illustrating an example of a columnar particle included in a negative electrode active material layer.
Figure 3:
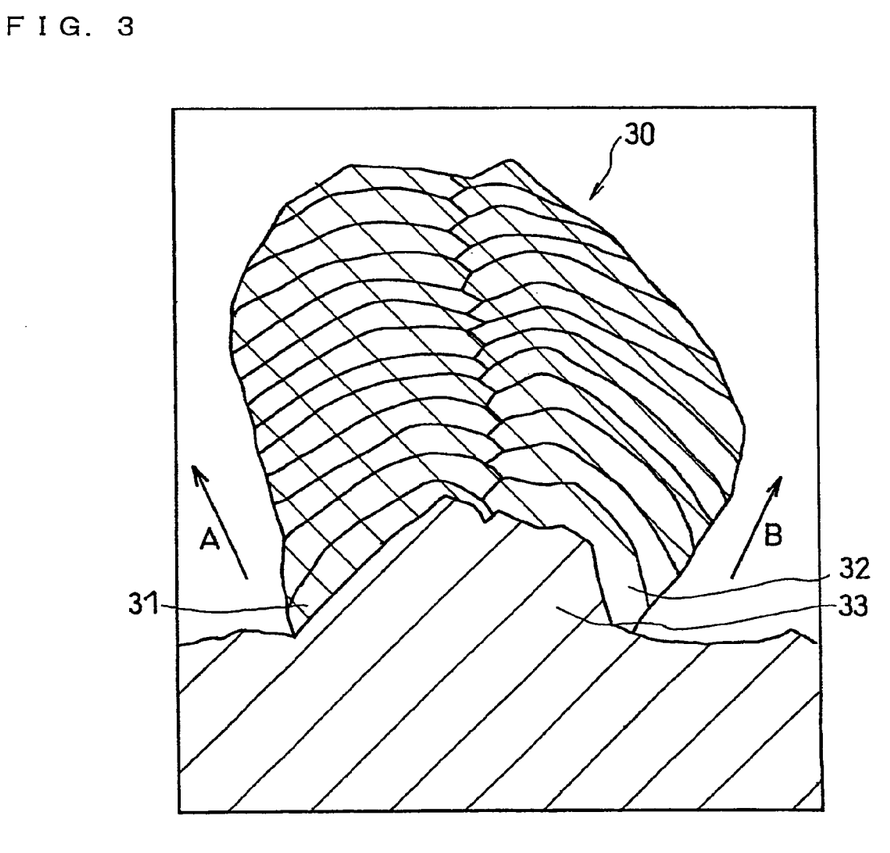
FIG. 3 is a vertical sectional view illustrating another example of a columnar particle included in a negative electrode active material layer.

Examples of the columnar particle are illustrated in FIGS. 2 and 3.

The columnar particle carried on a surface of the current collector may be composed of a single part, or may be composed of a stacking body of a plurality of particle layers as illustrated in FIGS. 2 and 3. In addition, the columnar particle may be grown in a direction roughly vertical to the surface of the negative electrode current collector, as illustrated in FIGS. 2 and 3. Alternatively, the columnar particle may be grown in a direction tilted from such vertical direction.

A columnar particle 20 in FIG. 2 has a stacking body including 8 particle layers which are particle layers 20a, 20b, 20c, 20d, 20e, 20f, 20g, and 20h. In the columnar particle in FIG. 2, the growing direction of the particle layer 20a is tilted from the normal direction of the surface of the current collector, in a first direction that is predetermined. The growing direction of the particle layer 20b is tilted from the normal direction of the surface of the current collector, in a second direction that is predetermined which differs from the first direction. In the same manner, particle layers included in the columnar particle 20 are each tilted from the normal direction of the surface of the current collector, alternately in the first direction and the second direction. In this manner, by alternately changing the growing direction of the particle layer in the first direction and the second direction when stacking the plurality of particle layers, the average growing direction of the columnar particle 20 as a whole can be made parallel to the normal direction of the surface of the current collector.

Alternatively, the growing directions of the particle layers may each be tilted in a different direction, as long as the growing direction of the columnar particle as a whole becomes parallel to the normal direction of the surface of the current collector.

The columnar particle 20 in FIG. 2 can be produced, for example, in the following manner. First, the particle layer 20a is formed in a manner covering the top of a projecting area 21 and one of the side faces continuing therefrom. Next, the particle layer 20b is formed in a manner covering the other side face of the projecting area 21 and a part of the top surface of the particle layer 20a. That is, in FIG. 2, the particle layer 20a is formed at one end including the top of the projecting area 21, and the particle layer 20b is formed at the other end of the projection area 21, partially overlapping the particle layer 20a. Further, the particle layer 20c is formed in a manner covering the remainder of the top surface of the particle layer 20a and a part of the top surface of the particle layer 20b. That is, the particle layer 20c is formed in a manner contacting mainly with the particle layer 20a. Further, the particle layer 20d is formed in a manner contacting mainly with the particle layer 20b. In the same manner, particle layers 20e, 20f, 20g, and 20h are alternately stacked, thus forming the columnar particle 20 as illustrated in FIG. 2.

In FIG. 3 also, a columnar particle 30 is formed on a projecting area 33 of a current collector. The columnar particle 30 has a plurality of first particle layers 31 and a plurality of second particle layers 32.

In the columnar particle 30 in FIG. 3, the number of particle layers stacked is more compared to the columnar particle 20 in FIG. 2. In addition, the thickness of each columnar particle 30 in FIG. 3 is thinner than the thickness of particle layers of the columnar particle 20 in FIG. 2. Further, the outline of the columnar particle 30 in FIG. 3 is smoother compared to the columnar particle 20 in FIG. 2.

In the columnar particle 30 in FIG. 3 also, the growing directions of particle layers may each be tilted from the normal direction of the surface of the current collector, as long as the average growing direction of the columnar particle as a whole becomes parallel to the normal direction of the surface of the current collector. In addition, in the columnar particle 30 in FIG. 3, the growing direction of the first particle layer 31 is a direction "A", and the growing direction of the second particle layer 32 is a direction "B".

Figure 4:
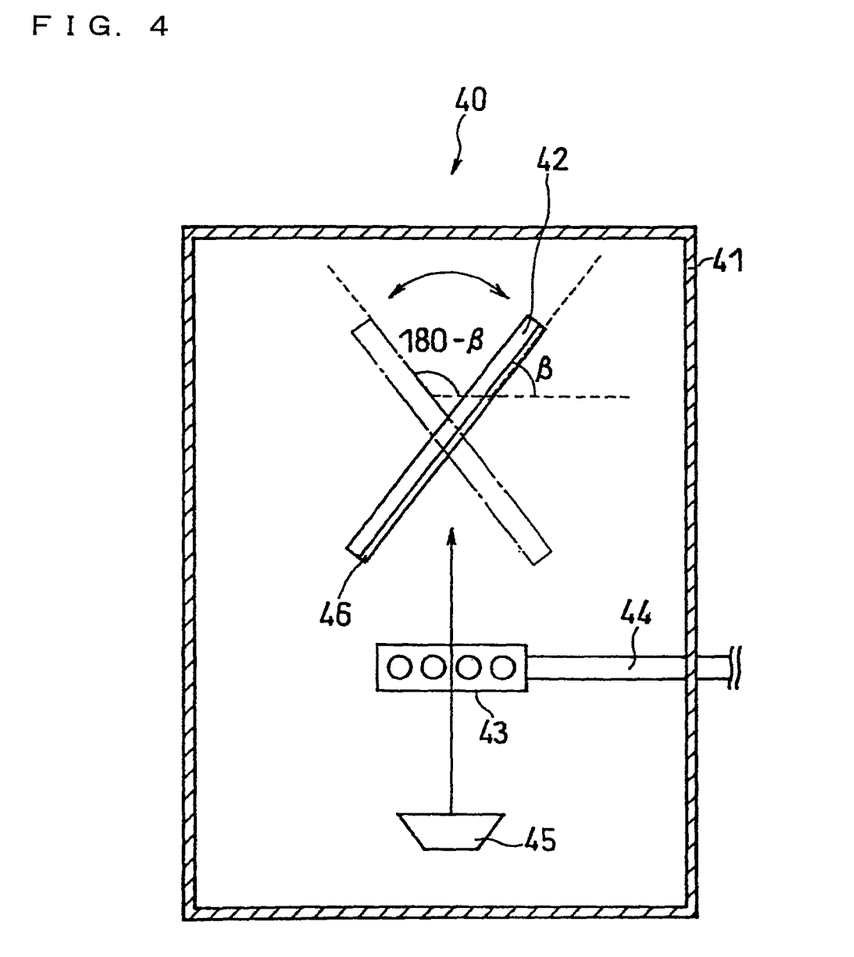
FIG. 4 is a schematic view illustrating a vapor deposition device used for producing the columnar particle.

The negative electrode active material layer including columnar particles 20 as illustrated in FIG. 2 can be produced, for example, by using a vapor deposition device 40 as illustrated in FIG. 4. FIG. 4 is a side view schematically illustrating the constitution of the vapor deposition device 40. Here, the case of using a silicon oxide as the negative electrode active material will be explained.

The vapor deposition device 40 in FIG. 4 is provided with a vacuum chamber 41, a fixed base 42, a nozzle 43, a pipe 44 for introducing oxygen gas into the vacuum chamber 41, and a means for electron beam heating (not illustrated). The nozzle 43 is connected to the pipe 44 which is incorporated into the vacuum chamber 41. The pipe 44 is connected to an oxygen tank (not illustrated) via a mass flow controller (not illustrated).

Above the nozzle 43, the fixed base 42 that fixes a negative electrode current collector 46 is set. Vertically below the fixed base 42, a target 45 is set. Between the target 45 and the negative electrode current collector 46, an oxygen atmosphere composed of oxygen gas is present. For the target 45, a material containing silicon such as a simple silicon substance can be used.

The fixed base 42 which is a plate-like member is rotatably supported inside the vacuum chamber 41, and fixed on one of the faces in the thickness direction thereof is the negative electrode current collector 46. The rotation of the fixed base 42 is conducted between the position indicated by a solid line and the position indicated by a dashed line in FIG. 4. The position indicated by the solid line is a position (a position "A") where the degree of an angle created by the fixed base 42 and a horizontal line is $\beta°$, when the face of the fixed base 42 to which the negative electrode current collector 46 is fixed faces toward the target 45 vertically below. The position indicated by the dashed line is a position (a position "B") where the degree of an angle created by the fixed base 42 and a horizontal line is $(180-\beta)°$, when the face of the fixed base 42 to which the negative electrode current collector 46 is fixed faces toward the target 45 vertically below. The degree of $\beta°$ can be selected as appropriate in accordance with the dimensions of the negative electrode active material layer to be formed.

In the method for producing the negative electrode active material layer by using the vapor deposition device 40, first, the negative electrode current collector 46 is fixed to the fixed base 42, and oxygen gas is introduced into the vacuum chamber 41. In this condition, the target 45 is irradiated with an electron beam to be heated, thus generating vapor thereof. For example, in the case of using silicon as the target 45, vaporized silicon passes through the oxygen atmosphere, and a silicon oxide is deposited on the surface of the current collector. At this time, by placing the fixed base 42 in the position of the solid line, the particle layer 20a as illustrated in FIG. 2 is formed on the projecting area provided on the current collector. Next, by rotating the fixed base 42 to the position of the dashed line, the particle layer 20b as illustrated in FIG. 2 is formed. By alternately changing the position of the fixed base 42 in such a manner, the columnar particle 20 having 8 particle layers as illustrated in FIG. 2 is formed.

Basically, the columnar particle 30 as illustrated in FIG. 3 can also be produced by using the vapor deposition device 40 in FIG. 4. The columnar particle 30 in FIG. 3 can be produced, for example, by making the vapor deposition time at the position "A" and the position "B" shorter than in the case of the columnar particle 20 in FIG. 2, thus increasing the number of particle layers that are stacked.

In addition, in each of the production methods mentioned above, a gap between columnar particles can be provided at regular intervals, if projections and depressions are regularly arranged on the current collector surface, and an active material layer including a plurality of columnar particles selectively carried on such projections is formed.

In the case of disposing the active material layer including a plurality of columnar particles only on one face of the current collector, a surface layer portion prone to plastic deformation may be disposed on the face of the current collector on which the active material layer is disposed, and projections and depressions may be formed thereon. Alternatively, in the case of disposing the active material layer on the both faces of the current collector, the surface layer portion prone to plastic deformation may be formed on the both faces of the current collector, and projections and depressions may be formed on the each surface layer portion.

An active material layer including a silicon oxide can by produced with the production method mentioned above, also by using a silicon oxide as a target and making that silicon oxide be deposited on the current collector, without having an oxygen atmosphere present between the current collector and the target.

Also possible is the depositing of silicon nitride on the current collector, by using a nitrogen atmosphere instead of an oxygen atmosphere and using a simple silicon substance as a target.

Further, an active material, for example, an active material particle composed of a simple silicon substance or an active material particle composed of a silicon alloy, can be produced in the vapor deposition device mentioned above, by using as a target a material (mixture included) containing a simple silicon substance or an element constituting a silicon alloy, and making such material evaporate under vacuum.

A cross-sectional area of the positive electrode lead can be obtained by (the width of the positive electrode lead)×(the thickness of the positive electrode lead). The width of the positive electrode lead can be obtained by measuring the width of the positive electrode lead at 2 to 10 predetermined areas thereof, and then averaging out the measured values obtained. The thickness of the positive electrode lead can be obtained by measuring with the use of, for example, an electron microscope, the thickness of the positive electrode lead at 2 to 10 predetermined cross sections vertical in the longitudinal axis direction and parallel to the thickness direction thereof, and then averaging out the measured values obtained.

A cross-sectional area of the negative electrode lead can be measured in the same manner as the cross-sectional area of the positive electrode lead.

For the positive electrode lead and the negative electrode lead, cross-sectional areas may either be the same or be different in the longer direction of the lead. The cross-sectional areas may be different in the longer direction of the lead, if they are within the range mentioned above.

The volume of the negative electrode current collector can be obtained by (the length of the negative electrode current collector)×(the thickness of the negative electrode current collector)×(the width of the negative electrode current collector).

In the case where projecting areas are disposed on one surface of the negative electrode current collector, the thickness of the negative electrode current collector is referred to as the distance in the thickness direction thereof: from the top of the projecting area thereof; to the surface thereof on the opposite side of the face on which projecting areas are disposed.

In the case where projecting areas are disposed on both faces of the negative electrode current collector, the thickness of the negative electrode current collector is referred to as the distance in the thickness direction thereof: from the top of the projecting area disposed on one face thereof; to the top of the projecting area disposed on the other face thereof.

The thickness of the negative electrode current collector can be obtained by measuring with the use of an electron microscope, the thickness of the negative electrode current collector at 2 to 10 predetermined vertical cross sections parallel to the thickness direction thereof, and then averaging out the measured values obtained.

The width of the negative electrode current collector can be obtained by measuring the width of the negative electrode current collector at 2 to 10 predetermined areas thereof, and then averaging out the measured values obtained.

The length of the negative electrode current collector can be obtained by measuring the length of the negative electrode current collector at 2 to 10 predetermined areas thereof, and then averaging out the measured values obtained.

Hereinafter, other components included in the non-aqueous electrolyte secondary battery of the present invention will be explained.

The positive electrode active material layer, for example, can contain a positive electrode active material, and a binder and a conductive agent as appropriate.

As the material composing the positive electrode current collector, a material well known in the art can be given. As an example of such material, aluminum can be given.

As the positive electrode active material as well as the binder and the conductive agent added to the positive electrode, materials well known in the art can be used. As the positive electrode active material, for example, a lithium composite oxide such as lithium cobaltate can be given. $Li_aNi_bCO_cM_dO_2$(M is at least one selected from the group consisting of Al, Mn, Sn, In, Fe, Cu, Mg, Ti, Zn, Zr, and Mo) can also be used as the positive electrode active material, since a battery with high capacity can be obtained.

As the binder added to the positive electrode, for example, polytetrafluoroethylene and polyvinylidene fluoride can be given.

As the conductive agent added to the positive electrode, for example: graphites such as natural graphite (such as scale-like graphite), artificial graphite, and expanded graphite; carbon blacks such as acetylene black, ketjen black, channel black, furnace black, lamp black, and thermal black; conductive fibers such as carbon fiber and metallic fiber; metallic powders such as of copper and nickel; and organic conductive materials such as a polyphenylene derivative can be given.

One of the above may be used alone, or two or more of the above may be used in a combination.

The non-aqueous electrolyte contains, for example, a non-aqueous solvent and a solute dissolved therein. As the non-aqueous solvent, for example, ethylene carbonate, propylene carbonate, dimethyl carbonate, diethyl carbonate, methyl ethyl carbonate, and the like; however, there is no limitation to the above. One of the above may be used alone, or two or more of the above may be used in a combination.

As the solute, for example, $LiPF_6$, $LiBF_4$, $LiCl_4$, $LiAlCl_4$, $LiSbF_6$, LiSCN, LiCl, $LiCF_3SO_3$, $LiCF_3CO_2$, $Li(CF_2SO_2)_2$, $LiAsF_6$, $LiN(CF_3SO_2)_2$, $LiB_{10}Cl_{10}$, and imides can be given. One of the above may be used alone, or two or more of the above may be used in a combination.

As the material composing the separator, a material well known in the art can be used. As such material: polyethylene, polypropylene, or a mixture of polyethylene and polypropylene; or a copolymer of ethylene and propylene can be given.

The form of the non-aqueous electrolyte secondary battery of the present invention is not particularly limited and may be, for example: a cylindrical type, a coin type, a sheet type, or a prismatic type. In addition, the non-aqueous electrolyte secondary battery may be a large-size battery used in electric cars and the like. The electrode plate group included in the non-aqueous electrolyte secondary battery of the present invention may be a wound type as illustrated in FIG. 1 or a stacked type.

The energy density by volume of the electrode plate group can be obtained by (the output power of the electrode plate group [Wh])/(the volume of the electrode plate group).

The output power of the electrode plate group [Wh] can be obtained by multiplying: a theoretical capacity of a battery (0.97× the theoretical capacity of the positive electrode); with a middle voltage during discharge (a voltage when a battery is discharged until a amount of the battery capacity becomes half a initial amount).

The volume of the electrode plate group can be obtained in the following manner. For example, in the case of a wound-type electrode plate group, the volume of the electrode plate group can be obtained by multiplying: the area of the face vertical in the winding axis direction, the face including the maximum diameter; with the maximum length of the electrode plate group parallel to the winding axis.

In the case of a stacked-type electrode plate group, the volume of the electrode plate group can be obtained by multiplying: an area of a face vertical in a stacking direction, the face including a maximum diameter; with a maximum length of the electrode plate group parallel to the stacking direction.

If the battery is, for example, a 18650 size battery having a capacity of 3 Ah or higher, the energy density of the electrode plate group is 750 Wh/L or higher by volume.

If the energy density of the electrode plate group would be 750 Wh/L or higher by volume, a predetermined lithium-containing composite oxide may be used as the positive electrode active material, and a predetermined carbon material may be used as the negative electrode active material.

EXAMPLES

Example 1

A non-aqueous electrolyte secondary battery as illustrated in FIG. 1 was fabricated.
(Battery 1)
(i) Fabrication of Positive Electrode As a positive electrode active material, lithium cobaltate ($LiCoO_2$) having an average particle size of 10 μm was used.

A positive electrode material mixture paste was obtained by mixing: 100 parts by weight of the positive electrode active material; 8 parts by weight of polyvinylidene fluoride (a binder); 3 parts by weight of acetylene black (a conductive material); and a proper amount of N-methyl-2-pyrrolidone (NMP). A positive electrode was obtained by applying the obtained paste to both faces of a positive electrode current collector made of aluminum foil, followed by drying and rolling. The thickness of the positive electrode active material layer was 70 μm per face of the current collector. The paste was not applied to the part of the current collector to which a positive electrode lead was connected.

The length, width, and thickness of the positive electrode current collector used were 750 mm, 50 mm, and 20 μm, respectively. The part to which the positive electrode lead was connected (that is, the exposed portion of the positive electrode current collector) was disposed at the end of the winding-start side of the positive electrode.

A positive electrode lead made of aluminum in strip form having a length of 50 mm and a width of 3 mm was prepared. The cross-sectional area of positive electrode lead for the face vertical in the longitudinal axis direction and parallel to the thickness direction thereof was $3×10^{-3}$ cm$^2$.

Figure 5:
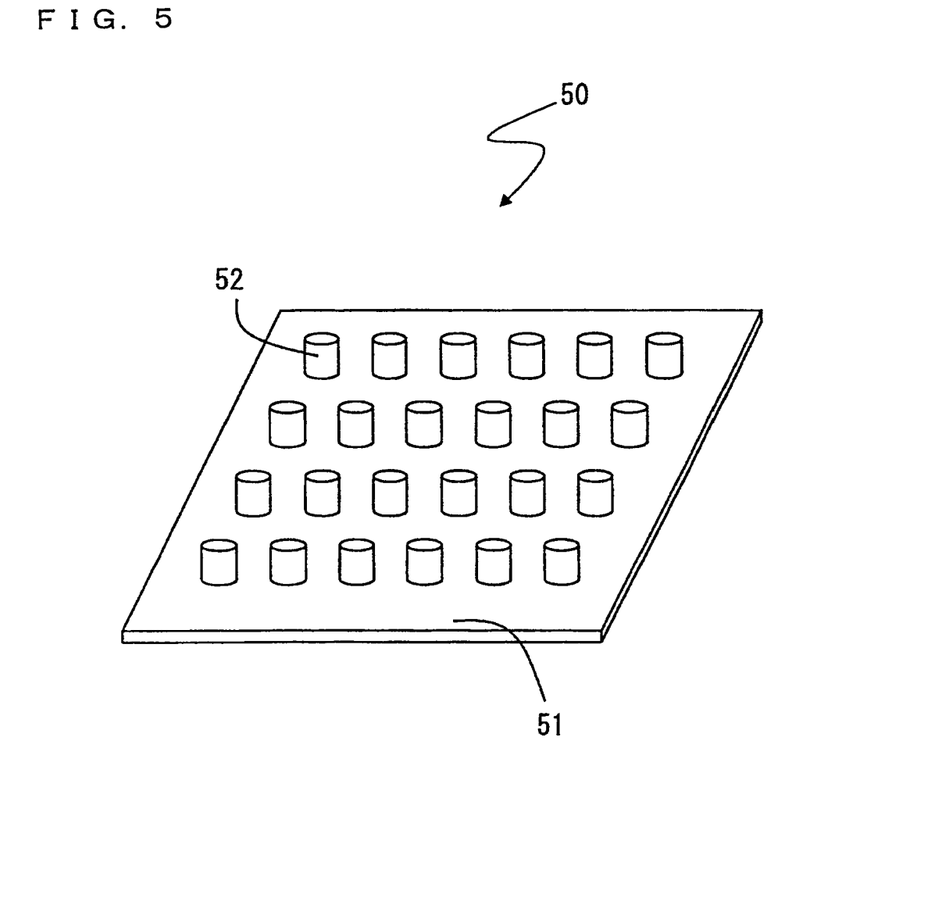
FIG. 5 is a perspective view schematically illustrating a negative electrode current collector used in the Examples.

The end of one side of the positive electrode lead vertical in the longitudinal axis direction was connected to the exposed portion of the positive electrode current collector mentioned above, by the ultrasonic welding method.
(ii) Fabrication of Negative Electrode First, a negative electrode current collector 50 made of copper as illustrated in FIG. 5 was prepared. Specifically, a negative electrode current collector 50 was prepared, as a substrate portion 51 with a plurality of projections 52 disposed thereon. Projection 52 were made columnar, and disposed on both sides of the current collector.

The negative electrode current collector 50 was fabricated by forming projections on a copper foil with the use of a processing roll for projection formation and a backup roll supporting the processing roll. For the processing roll for projection formation, an iron roll with a chromium oxide layer disposed thereon was used. The chromium oxide layer was formed by spraying chromium oxide on the iron roll. A plurality of pores were regularly formed on the chromium oxide layer. Pores were formed by means of laser processing. The diameter and the depth of the pore were 10 μm and 11 μm, respectively. The center-to-center distance between adjacent pores was 20 μm.

The length, width, and thickness of the obtained negative electrode current collector were 800 mm, 55 mm, and 40 μm, respectively. The thickness of the negative electrode current collector was the distance between: the top of the projection disposed on one surface of the negative electrode current collector in the thickness direction thereof; and the top of the projection disposed on the other surface thereof.

Next, a negative electrode active material layer including columnar particles 20 as illustrated in FIG. 2 was formed by using a vapor deposition device 40 as illustrated in FIG. 4. The negative electrode active material layer was formed, excluding the part of the negative electrode current collector to which a negative electrode lead was connected. The part of the negative electrode to which the negative electrode lead was connected (that is, the exposed portion of the negative electrode current collector) was disposed at the end of the winding-end side of the negative electrode.

The negative electrode current collector mentioned above was fixed to a fixed base 42. The fixed base 42 was tilted so that the angle created by the fixed base 42 and a horizontal plane became 60° (a position "A").

Vertically below the fixed base 42, a target 45 to be deposited on the surface of the negative electrode current collector was set. For the target 45, a simple silicon substance having a purity of 99.9999% (manufactured by Kojundo Chemical Laboratory Co., Ltd.) was used.

The accelerating voltage and emission of the electron beam for irradiating the simple silicon substance as the target 45 were −8 kV and 500 mA, respectively. The flow rate of oxygen gas (having a purity of 99.7%, manufactured by Nihon Sanso Corporation) to discharge from the nozzle was 80 sccm. A first particle layer 20a was formed on a projection 52 by making silicon and oxygen be deposited on the negative electrode current collector set on the fixed base 42. The vapor deposition time was set to 2 minutes and 30 seconds.

Next, the fixed base 42 was tilted as illustrated in FIG. 4, so that the angle created by the fixed base 42 and a horizontal plane would be 120° (that is, (180-β)° (a position "B"). With the same conditions as in the case of the first particle layer 20a, a second particle layer 20b was formed on the first particle layer 20a. By alternately changing the position of the fixed base 42 to the position "A" and the position "B" in this manner, a columnar particle 20 including a stacking body of 8 particle layers was formed.

In the same manner, a negative electrode active material layer composed of a plurality of columnar particles was formed also on the other face of the negative electrode current collector. In this manner, a negative electrode plate was obtained.

The thickness of the negative electrode active material layer was 25 μm per face of the current collector. The oxygen content in the negative electrode active material layer was determined by a combustion method. As a result, the composition of the negative electrode active material was $SiO_{0.5}$.

Next, metallic lithium was vapor deposited on the surface of the obtained negative electrode plate in the following manner, by using a resistance-heating vapor deposition device (manufactured by ULVAC Inc.). The negative electrode plate and a tantalum boat were placed inside the vapor deposition device, and a predetermined amount of metallic lithium was loaded in the boat. The boat was fixed so as to face the active material layer of the negative electrode plate. The value of the current to apply to the boat was set to 50 A, and vapor deposition was conducted for 10 minutes. By making metallic lithium be vapor deposited on the negative electrode plate, an irreversible capacity of lithium stored during initial charge and discharge was supplied in the negative electrode active material.

In this manner, a negative electrode was obtained.

A negative electrode lead made of nickel in strip form having a length of 50 mm and a width of 3 mm was prepared. The cross-sectional area of the negative electrode lead for the face vertical in the longitudinal axis direction and parallel to the thickness direction thereof was $3 \times 10^{-2}$ cm². The ratio of the cross-sectional area of the negative electrode lead relative to the volume of the negative electrode current collector was $1.7 \times 10^{-3}$ cm²/cm³. The volume of the negative electrode current collector was obtained by (the thickness of the negative electrode current collector)×(the length of the negative electrode current collector)×(the width of the negative electrode current collector).

The end of one side of the negative electrode lead vertical in the longitudinal axis direction was connected to the exposed portion of the negative electrode current collector mentioned above, by the ultrasonic welding method.

(iii) Assembling of Battery

A stacking body was obtained by stacking the positive electrode and the negative electrode fabricated as mentioned above, with a separator composed of a polyethylene microporous film having a thickness of 20 μm (manufactured by Asahi Kasei Corporation) interposed therebetween. In the obtained stacking body, the end of the positive electrode to which the positive electrode lead was connected was disposed at the winding-start side of the stacking body, and the end of the negative electrode to which the negative electrode lead was connected was disposed at the winding-end side of the stacking body.

The stacking body obtained in this manner was wound, thus obtaining an electrode plate group. In the obtained electrode plate group, the projecting direction of the positive electrode lead and the projecting direction of the negative electrode lead were made opposite of one another.

The obtained electrode plate group was contained in a battery case made of iron having a diameter (inner diameter) of 17.7 mm and a height of 67 mm. The other end of the positive electrode lead was connected to the bottom face of the sealing plate by a laser welding method. The other end of the negative electrode lead was connected to the inner bottom face of the battery case by a resistance welding method. An upper insulating plate and a lower insulating plate were provided at the upper portion and the lower portion of the electrode plate group, respectively.

A non-aqueous electrolyte was injected into the battery case. The non-aqueous electrolyte was prepared by dissolving $LiPF_6$ at a concentration of 1.0 mol/L in a mixed solvent containing ethylene carbonate and ethyl methyl carbonate at a volume ratio of 1:1.

The opening of the battery case was sealed, by crimping the opening end of the battery case with a polypropylene gasket interposed therebetween. In this manner, a non-aqueous electrolyte secondary battery was fabricated. The obtained battery was a battery 1. The design capacity of the battery 1 was 3000 mAh. The energy density of the electrode plate group included in the battery 1 was 750 Wh/L by volume. In each battery fabricated hereinafter as well, the design capacity thereof was 3000 mAh and the energy density of the electrode plate group thereof was 750 Wh/L by volume.

(Batteries 2 to 6)

Batteries 2 to 6 were fabricated in the same manner as battery 1, except for making the cross-sectional area of the positive electrode lead be $1.0 \times 10^{-1}$ cm² and the cross-sectional area of the negative electrode lead be $1.0 \times 10^{-5}$ cm² (battery 2), $5.5 \times 10^{-5}$ cm² (battery 3), $3 \times 10^{-3}$ cm² (battery 4), $1.2 \times 10^{-2}$ cm² (battery 5), or $1 \times 10^{-1}$ cm² (battery 6). In batteries 2 to 6, the ratios of the cross-sectional area of the negative electrode lead relative to the volume of the negative electrode current collector were each $5.7 \times 10^{-6}$ cm²/cm³ (battery 2), $3.1 \times 10^{-5}$ cm²/cm³ (battery 3), $1.7 \times 10^{-3}$ cm²/cm³ (battery 4), $6.8 \times 10^{-3}$ cm²/cm³ (battery 5), and $5.7 \times 10^{-2}$ cm²/cm³ (battery 6).

(Batteries 7 to 10)

Batteries 7 to 10 were fabricated in the same manner as battery 1, except for making the cross-sectional area of the negative electrode lead be $1.0 \times 10^{-1}$ cm² and the cross-sectional area of the positive electrode lead be $1.0 \times 10^{-5}$ cm² (battery 7), $5.5 \times 10^{-5}$ cm² (battery 8), $3 \times 10^{-3}$ cm² (battery 9), or $1.2 \times 10^{-2}$ cm² (battery 10). In batteries 7 to 10, the ratios of the cross-sectional area of the negative electrode lead relative to the volume of the negative electrode current collector were each $5.7 \times 10^{-2}$ cm²/cm³.

(Batteries 11 to 12)

Batteries 11 to 12 were fabricated in the same manner as battery 4, except for making the material of the negative electrode lead be copper (battery 11) or a copper-nickel clad material (copper:nickel=1:1 (thickness ratio)) (battery 12).

Table 1 shows the cross-sectional area of the negative electrode lead, the cross-sectional area of the positive electrode lead, and the ratio of the cross-sectional area of the negative electrode lead relative to the volume of the negative electrode current collector for batteries 1 to 12. Batteries 2, 6, and 7 are comparative batteries.

[Evaluation]
(With or without Melting of Lead During High-Output Discharge)

10 pieces per battery number were charged under a 25° C. environment with a 1500 mA current, until the battery voltage became 4.2 V. The charged batteries were discharged under a 60° C. environment with a 6 C current value (that is, 18 A), until the battery voltage lowered to 2 V.

In the case of the lead melting during the above, discharge of the battery would not be possible until the battery voltage lowered to 2 V. Therefore, lead was melted in the case where discharge until 2 V was not possible. The melting of the lead was checked by disassembling the battery, as appropriate.

The results are shown in Table 1.

(External Short Circuit Test)

10 pieces per battery number were charged under a 25° C. environment with a 1500 mA current, until the battery voltage became 4.25 V. The charged batteries were left for 1 hour under a 60° C. environment. Then, the positive electrode and the negative electrode in each of the charged batteries were short-circuited under a 60° C. environment. At this time, the number of the batteries whose surface temperature exceeded 80° C. was counted. In this external short circuit test, the battery whose surface temperature does not exceed 80° C. is considered to be a battery having external short circuit resistant characteristics that are favorable. That is, in this external short circuit test, the batteries are required to exhibit external short circuit resistant characteristics that are extremely favorable.

The results are shown in Table 1.

From Table 1, it is evident that the lead melts during high-output discharge, or the battery temperature exceeds 80° C. when an external short circuit occurs, if the cross-sectional area of at least one of the negative electrode lead and the positive electrode lead is outside the range of $5.5 \times 10^{-5}$ to $1.2 \times 10^{-2}$ cm$^2$.

Among the batteries of the Examples, it is evident that further favorable results are achieved in Batteries 1, 4, and 5, whose ratios of the cross-sectional area of the negative electrode lead relative to the volume of the negative electrode current collector are within the range of $1.0 \times 10^{-4}$ to $7.0 \times 10^{-3}$ cm$^2$/cm$^3$.

In addition, batteries 1 and 3 to 5 whose cross-sectional areas of the negative electrode lead were within the range of $5.5 \times 10^{-5}$ to $1.2 \times 10^{-2}$ cm$^2$ exhibited further favorable results, compared to batteries 8 to 10 whose cross-sectional areas of the positive electrode lead were within the range of $5.5 \times 10^{-5}$ to $1.2 \times 10^{-2}$ cm$^2$. From this result, it is evident that the cross-sectional area of at least the negative electrode lead is preferably within the range of $5.5 \times 10^{-5}$ to $1.2 \times 10^{-2}$ cm$^2$.

From the results of batteries 11 and 12, it is evident that favorable results can be achieved even in the case where the material of the negative electrode lead is copper or a copper-nickel clad material, if the cross-sectional area is within the range of $5.5 \times 10^{-5}$ to $1.2 \times 10^{-2}$ cm$^2$.

As the combination of the positive electrode active material and the negative electrode active material enabling the energy density of the electrode plate group to be 750 Wh/L or higher

TABLE 1

| | Material Constituting Negative Electrode Lead | Material Constituting Positive Electrode Lead | Cross-Sectional Area of Negative Electrode Lead (cm$^2$) | Cross-Sectional Area of Positive Electrode Lead (cm$^2$) | Ratio of Cross-Sectional Area of Negative Electrode Lead Relative to Volume of Negative Electrode Current Collector (cm$^2$/cm$^3$) | Number of Batteries whose Lead(s) Melted during High-Power Discharge (pcs) | Number of Batteries whose Surface Temperature Exceeded 80° C. (pcs) |
|---|---|---|---|---|---|---|---|
| Battery 1 | Ni | Al | $3.0 \times 10^{-3}$ | $3.0 \times 10^{-3}$ | $1.7 \times 10^{-3}$ | 0/10 | 0/10 |
| Comp. Battery 2 | Ni | Al | $1.0 \times 10^{-5}$ | $1.0 \times 10^{-1}$ | $5.7 \times 10^{-6}$ | 10/10 | 0/10 |
| Battery 3 | Ni | Al | $5.5 \times 10^{-5}$ | $1.0 \times 10^{-1}$ | $3.1 \times 10^{-5}$ | 3/10 | 0/10 |
| Battery 4 | Ni | Al | $3.0 \times 10^{-3}$ | $1.0 \times 10^{-1}$ | $1.7 \times 10^{-3}$ | 0/10 | 0/10 |
| Battery 5 | Ni | Al | $1.2 \times 10^{-2}$ | $1.0 \times 10^{-1}$ | $6.8 \times 10^{-3}$ | 0/10 | 1/10 |
| Comp. Battery 6 | Ni | Al | $1.0 \times 10^{-1}$ | $1.0 \times 10^{-1}$ | $5.7 \times 10^{-2}$ | 0/10 | 10/10 |
| Comp. Battery 7 | Ni | Al | $1.0 \times 10^{-1}$ | $1.0 \times 10^{-5}$ | $5.7 \times 10^{-2}$ | 10/10 | 0/10 |
| Battery 8 | Ni | Al | $1.0 \times 10^{-1}$ | $5.5 \times 10^{-5}$ | $5.7 \times 10^{-2}$ | 3/10 | 0/10 |
| Battery 9 | Ni | Al | $1.0 \times 10^{-1}$ | $3.0 \times 10^{-3}$ | $5.7 \times 10^{-2}$ | 1/10 | 1/10 |
| Battery 10 | Ni | Al | $1.0 \times 10^{-1}$ | $1.2 \times 10^{-2}$ | $5.7 \times 10^{-2}$ | 0/10 | 3/10 |
| Battery 11 | Cu | Al | $3.0 \times 10^{-3}$ | $1.0 \times 10^{-1}$ | $1.7 \times 10^{-3}$ | 0/10 | 0/10 |
| Battery 12 | Cu—Ni Crud Material | Al | $3.0 \times 10^{-3}$ | $1.0 \times 10^{-1}$ | $1.7 \times 10^{-3}$ | 0/10 | 0/10 | by volume, for example, a combination of $Li_aNi_bCO_cAl_dO_2$ and natural graphite can be given besides the combinations shown in the above Examples.

INDUSTRIAL APPLICABILITY

By the present invention, non-aqueous electrolyte secondary batteries having further improved safety can be provided. Such non-aqueous electrolyte secondary batteries can be suitably used as a power supply, for example, for portable electronic devices.

The invention claimed is:

1. A non-aqueous electrolyte secondary battery comprising an electrode plate group and
a non-aqueous electrolyte,
wherein said electrode plate group comprises:
    a positive electrode;
    a negative electrode;
    a separator interposed between said positive electrode and said negative electrode;
    a positive electrode lead connected to said positive electrode; and
    a negative electrode lead connected to said negative electrode,
said negative electrode comprises
    a negative electrode active material layer and
    a negative electrode current collector,
        said negative electrode active material layer comprises a material comprising at least one member selected from the group consisting of silicon and tin; and
        said negative electrode active material layer formed on said negative electrode current collector, and
        the ratio of the cross-sectional area of said negative electrode lead relative to the volume of said negative electrode current collector is $1.0 \times 10^{-4}$ to $7.0 \times 10^{-3}$ $(cm^2/cm^3)$,
said electrode plate group has an energy density of not less than 750 Wh/L by volume, and
at least one of said positive electrode lead and said negative electrode lead is in a strip form, and has a uniform width and a uniform cross-sectional area of $5.5 \times 10^{-5}$ to $1.2 \times 10^{-2}$ $cm^2$, both in a longitudinal direction of the entire at least one of said positive electrode lead and said negative electrode lead.

2. The non-aqueous electrolyte secondary battery in accordance with claim 1, wherein said negative electrode active material layer comprises a plurality of columnar particles comprising said negative electrode active material, and said columnar particle is grown from a surface of said negative electrode current collector in a direction vertical to said surface of said negative electrode current collector or in a direction tilted from said vertical direction.

3. The non-aqueous electrolyte secondary battery in accordance with claim 2, wherein said columnar particle comprises a stacking body comprising a plurality of particle layers.

4. The non-aqueous electrolyte secondary battery in accordance with claim 3, wherein each of said particle layers grows in a different direction.

5. The non-aqueous electrolyte secondary battery in accordance with claim 3, wherein the growing directions of said plurality of particle layers comprising said stacking body are tilted from a normal direction of said surface of said current collector, alternately in a first direction and a second direction.

6. The non-aqueous electrolyte secondary battery in accordance with claim 1, wherein said material comprises at least one member selected from the group consisting of a simple silicon substance, a silicon alloy, a compound comprising silicon and oxygen, and a compound comprising silicon and nitrogen.

7. The non-aqueous electrolyte secondary battery in accordance with claim 1, wherein said material comprises at least one selected from the group consisting of a simple tin substance, a tin alloy, and a compound comprising tin and oxygen.

* * * * *